United States Patent
Nakano et al.

(10) Patent No.: US 9,036,501 B2
(45) Date of Patent: May 19, 2015

(54) WIRELESS COMMUNICATION DEVICE

(75) Inventors: Hisao Nakano, Tokyo (JP); Yasunori Hoshihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 144 days.

(21) Appl. No.: 13/880,949

(22) PCT Filed: Jan. 28, 2011

(86) PCT No.: PCT/JP2011/000472
§ 371 (c)(1), (2), (4) Date: Apr. 22, 2013

(87) PCT Pub. No.: WO2012/101680
PCT Pub. Date: Aug. 2, 2012

(65) Prior Publication Data
US 2013/0208618 A1    Aug. 15, 2013

(51) Int. Cl.
| | | |
|---|---|---|
| H04L 7/10 | (2006.01) |
| H04L 12/701 | (2013.01) |
| H04W 80/04 | (2009.01) |
| H04W 88/06 | (2009.01) |
| H04W 28/04 | (2009.01) |
| H04W 72/04 | (2009.01) |
| H04W 72/02 | (2009.01) |
| H04W 16/14 | (2009.01) |
| H04W 72/08 | (2009.01) |

(52) U.S. Cl.
CPC .............. *H04W 72/02* (2013.01); *H04W 16/14* (2013.01); *H04W 72/082* (2013.01)

(58) Field of Classification Search
CPC ....... H04L 47/10; H04L 43/50; H04W 80/04; H04W 88/06; H04W 28/04; H04W 72/04
USPC .......................................... 370/252, 328, 329
See application file for complete search history.

(56) References Cited

U.S. PATENT DOCUMENTS

| | | | |
|---|---|---|---|
| 2008/0043715 A1* | 2/2008 | Ijiri ............................... 370/350 |
| 2009/0016545 A1* | 1/2009 | Stelliga et al. ................ 381/94.3 |
| 2009/0103591 A1* | 4/2009 | Chari et al. .................... 375/136 |
| 2010/0008316 A1 | 1/2010 | Liu et al. |
| 2010/0135214 A1 | 6/2010 | Ishizu et al. |

FOREIGN PATENT DOCUMENTS

| | | |
|---|---|---|
| JP | 2006-279500 A | 10/2006 |
| JP | 2007-243765 A | 9/2007 |

(Continued)

*Primary Examiner* — Ronald B Abelson
(74) *Attorney, Agent, or Firm* — Birch, Stewart, Kolasch & Birch, LLP

(57) ABSTRACT

A wireless communication device comprises: a detector configured to detect an interference wave and a frequency of the interference wave, the interference wave causing radio interference in the wireless communication; an interference avoidance controller configured to predict duration where the wireless communication is affected by radio interference due to the interference wave, and configured to issue a command for avoiding the radio interference due to the interference wave when the predicted duration exceeds a threshold time period; and a frequency controller configured to control frequencies used in the wireless communication to exclude the frequency of the interference wave in accordance with the command for avoiding the radio interference issued by the interference avoidance controller.

7 Claims, 7 Drawing Sheets

(56) References Cited

FOREIGN PATENT DOCUMENTS

| JP | 2010-119087 A | 5/2010 | | |
|---|---|---|---|---|
| JP | 2010-135947 A | 6/2010 | | |
| JP | 2010-178108 A | 8/2010 | | |
| JP | WO 2010125635 | * | 11/2010 | ........... H04W 24/10 |
| JP | 2010-278764 A | 12/2010 | | |

* cited by examiner

| Order of Priority | Type of Communication Data | Communication System ||
|---|---|---|---|
| | | Wireless LAN | Bluetooth |
| High | Audio | A | D |
| Medium | Video, Music | B | E |
| Low | Data | C | F |

(a) Threshold Intensity Table (b) Threshold Intensity Application Model

FIG.8

| | Channel | | | |
|---|---|---|---|---|
| Location | 1 | 2 | ... | 13 |
| A | -50 | -90 | | -70 |
| B | -48 | -90 | | -73 |
| : | | | | |
| E | -46 | -88 | | -68 |

WIRELESS COMMUNICATION DEVICE

TECHNICAL FIELD

This invention relates to wireless communication devices which is configured to avoid radio interference in wireless communication.

BACKGROUND ART

In recent years, a plurality of wireless communication systems is loaded on information devices to be mounted on movable bodies, typically car navigation systems. The wireless communication systems are used for a variety of applications. For example, a wireless communication system of Bluetooth is used for hands free calls, dial-up connection, and music replay between terminals, e.g., cell phones and audio players. Communication of various kinds of information is performed by wireless LAN communication systems such as IEEE802.11b/g with terminals such as personal computers and smart phones or with external access points for use in navigation and various applications.

Those Bluetooth wireless communication system and wireless LAN communication system such as IEEE802.11b/g use the same frequency band of 2.4 GHz band. Therefore, if those wireless communication systems are used simultaneously in the same area, such as an interior of a mobile object, radio interference may occur. As a result, communication quality of the both wireless communication systems may deteriorate due to the interference between them.

With the recent prevalence of wireless LAN, wireless LAN is widely used also outside the mobile object. Therefore, radio interference from other wireless LAN networks, such as an external access point and an adjacent vehicle, are also considerable. In this case, radio interference among wireless LAN networks may occur depending on a frequency allocation, as well as the interference between the wireless LAN network and the Bluetooth system.

As a method of solve the foregoing issues, Patent Literature 1 discloses an vehicle-mounted communication device. The disclosed device is configured to predict occurrence of wireless communication between a base station and the external vehicle-mounted communication device before starting wireless communication between a mobile terminal and the vehicle-mounted communication device. The disclosed device is further configured to restrict use of frequencies that may cause radio interference, and start wireless communication between the mobile terminal and the vehicle-mounted communication device by using available frequencies.

CITATION LIST

Patent Literature 1: JP-A-2007-243765

SUMMARY OF INVENTION

In the foregoing Patent Literature 1, however, consideration is not given to the fact that, with movement of a user-owned mobile object or an adjacent mobile object, influence of radio interference may vary by a change of channels or intensity of interference wave. Hence, in the prior art, radio interference can be avoided only in a wireless LAN network used by the wireless device of the user-owned vehicle before starting wireless communication. In other words, radio interference caused by communication between the wireless device of the user-owned vehicle and an access point can be avoided. However, it is hard to avoid interference caused by another wireless LAN network which is not used by the user-owned vehicle.

This invention has been made to cope with the foregoing problem, and made for providing a wireless communication device which is capable of avoiding radio interference with taking into account of influence caused by variation in the radio interference.

A wireless communication device according to the present invention includes: a detector configured to detect an interference wave and a frequency of the interference wave, the interference wave causing radio interference in the wireless communication; an interference avoidance controller configured to predict duration where the wireless communication is affected by radio interference due to the interference wave, and configured to issue a command for avoiding the radio interference due to the interference wave when the predicted duration exceeds a threshold time period; and a frequency controller configured to control frequencies used in the wireless communication to exclude the frequency of the interference wave in accordance with the command for avoiding the radio interference issued by the interference avoidance controller.

According to the present invention, radio interference can be avoided with taking into account of influence caused by variation in the radio interference.

BRIEF DESCRIPTION OF DRAWINGS

FIG. 8 depicts one example of location versus interference level table of the wireless communication device according to the Embodiment 2.

DESCRIPTION OF EMBODIMENTS

Embodiments for carrying out the present invention are described in below by referring to the accompanying drawings to describe this invention in more detail.
(Embodiment 1.)

Figure 1:
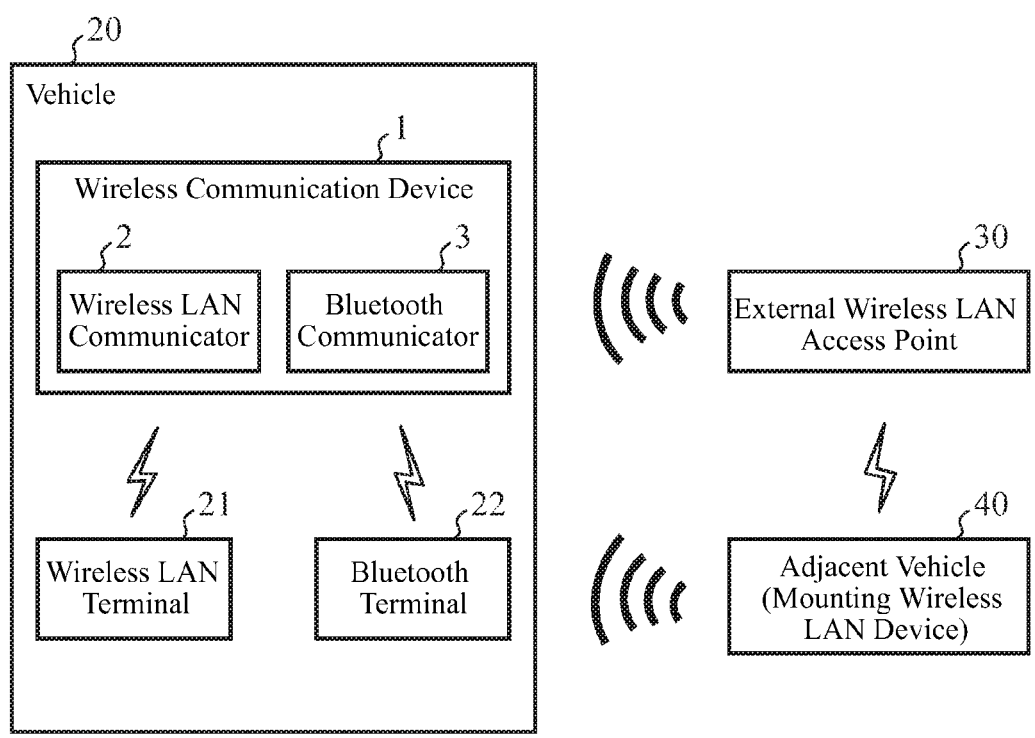
FIG. 1 is a schematic explanatory diagram depicting a wireless communication device according to Embodiment 1 of the present invention.

FIG. 1 is a schematic explanatory diagram depicting a wireless communication device according to Embodiment 1 of this invention.

In FIG. 1, a wireless communication device 1 of the Embodiment 1 is mounted on a vehicle 20 which is owned by a user. An external wireless LAN access point 30 and an adjacent vehicle 40 mounting a wireless LAN communication device are located outside the vehicle 20. A wireless LAN communicator 2 in the wireless communication device 1 of the vehicle 20 is in communication with a wireless LAN terminal 21 taken into the car. A Bluetooth communicator 3 is in communication with a Bluetooth terminal 22 taken into the car. The external wireless LAN access point 30 is in communication with a wireless LAN communication device mounted on the adjacent vehicle 40.

In FIG. 1, the wireless LAN communicator 2 and the Bluetooth communicator 3 that are both mounted on the vehicle 20 may be affected by radio interference due to wireless signals being used by the external wireless LAN access point 30 or the wireless LAN communication device mounted on the adjacent vehicle 40. A configuration for avoiding the radio interference is described in detail below.

Figure 2:
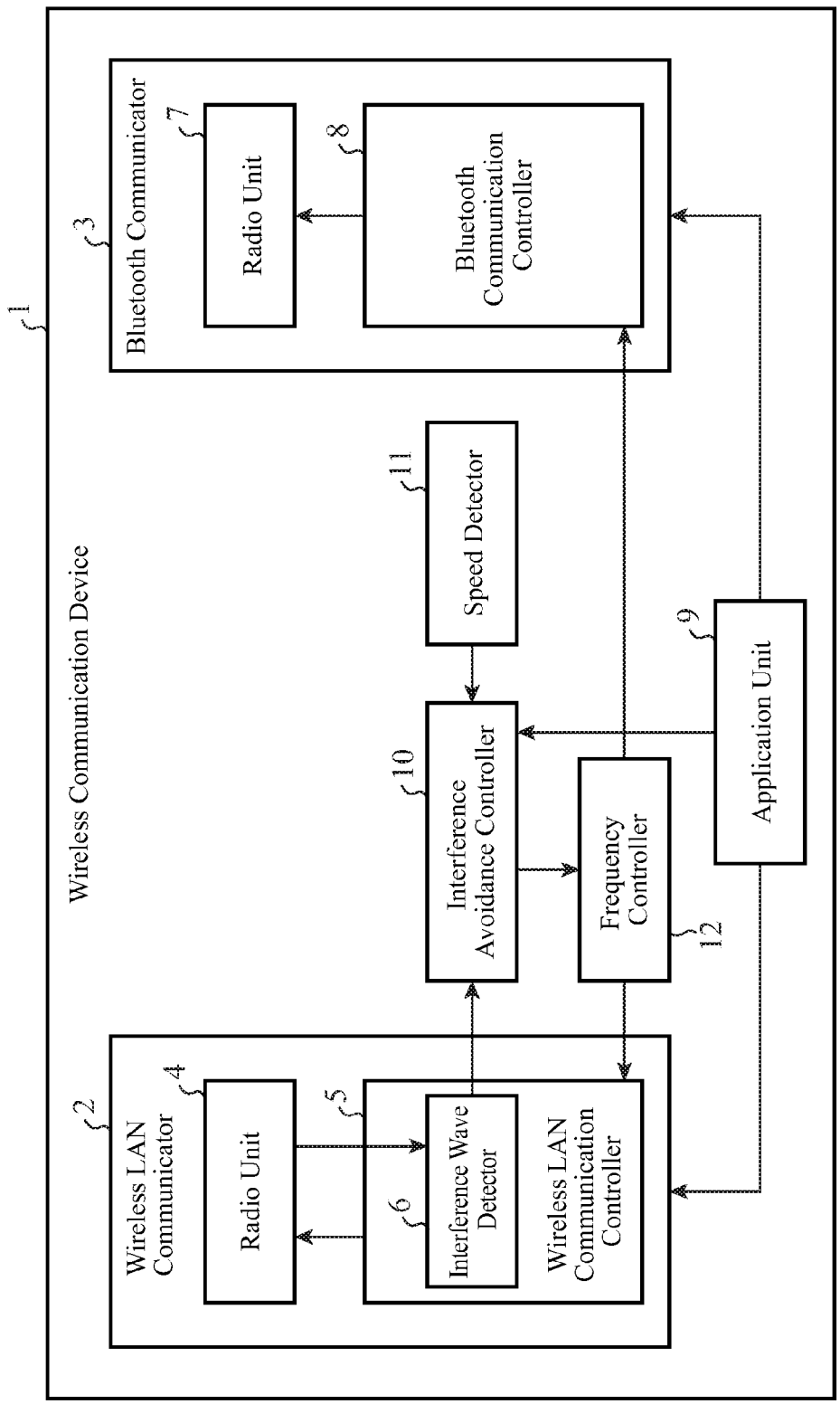
FIG. 2 is a block diagram depicting a configuration of the wireless communication device according to the Embodiment 1.

FIG. 2 is a block diagram depicting a configuration of the wireless communication device according to the Embodiment 1 of this invention.

The wireless communication device 1 comprises two wireless communicators of the wireless LAN communicator 2 and the Bluetooth communicator 3, an application unit 9, an interference avoidance controller 10, a speed detector 11, and a frequency controller 12.

The wireless LAN communicator 2 includes a radio unit 4, a wireless LAN communication controller 5, and an interference wave detector 6. The radio unit 4 establishes wireless LAN communication with, for instance, the wireless LAN terminal 21 depicted in FIG. 1. The wireless LAN communication controller 5 controls the radio unit 4 to implement communication at a frequency set by the frequency controller 12.

The interference wave detector 6 sequentially switches the receiving channel of the radio unit 4, and detects radio signals (hereinafter referred to as "interference wave") that are being used by a surrounding wireless LAN device, e.g., a wireless LAN device mounted on the adjacent vehicle 40 of FIG. 1. The interference wave detector 6 obtains a channel and intensity of the detected interference wave. In other words, so-called channel scan operation is performed. The channel scan operation may be performed not only before start of communication by the radio unit 4 but also periodically within an idle period during communication or in a power save mode in the background. By performing the channel scan operation, channel transition of the interference wave and fluctuation in intensity of the interference wave due to the movement of the mobile object are detected.

The Bluetooth communicator 3 includes a radio unit 7 and a Bluetooth communication controller 8. The radio unit 7 establishes Bluetooth communication with, for instance, the Bluetooth terminal 22 depicted in FIG. 1. The Bluetooth communication controller 8 controls the radio unit 7 to perform communication at a frequency set by the frequency controller 12.

The application unit 9 has information including communication data types (audio/video; music/data) and communication systems (wireless LAN/Bluetooth) of currently running applications. The application unit 9 outputs communication requests corresponding to these communication data types and communication systems to the wireless LAN communicator 2 and the Bluetooth communicator 3. The application unit 9 informs the interference avoidance controller 10 of information relating to the currently running applications.

On being informed of detection of an interference wave by the interference wave detector 6, the interference avoidance controller 10 determines whether or not intensity of the detected interference wave is at a level that deteriorates communication quality of the wireless LAN communicator 2 and the Bluetooth communicator 3. When a result of the determination indicates affirmation, the interference avoidance controller 10 predicts duration of radio interference caused by the interference wave, and outputs a command for avoiding a frequency of the interference wave on a basis of the predicted duration.

The speed detector 11 detects traveling speed of a mobile object (e.g. the vehicle 20 in FIG. 1) in which the wireless communication device 1 is mounted. The frequency controller 12 sets frequencies used for relative communications of the wireless LAN communicator 2 and the Bluetooth communicator 3. The frequency controller 12 refers to the command from the interference avoidance controller 10, and controls the frequencies of the wireless LAN communicator 2 and the Bluetooth communicator 3 to exclude the frequency of the interference wave in a case where the command indicates that control for avoiding the frequency of the interference wave is needed.

Details of the interference avoidance controller 10 are described next.

The interference avoidance controller 10 obtains information relating to running applications from the application unit 9, and selects an application corresponding to the highest priority from among the currently running applications. The interference avoidance controller 10 holds in advance priority order for the communication data types (audio/video; music/data) and priority order for the communication systems (wireless LAN/Bluetooth) as follows:

Priority order for communication data types: audio>video; music>data

Priority order for communication systems: wireless LAN<Bluetooth

In determining priority order, the priority order of the communication data types is first determined, and the priority order of the communication systems is determined when the priority order of the communication data types is the same.

Subsequently, on being informed by the interference wave detector 6 of detection of an interference wave, the interference avoidance controller 10 sets threshold intensity for use in determination as to whether or not the intensity of the detected interference wave is at a level that may deteriorate communication quality of the wireless LAN communicator 2 and the Bluetooth communicator 3. The interference avoidance controller 10 holds in advance a table in which threshold intensities are associated with the communication data types and the communication systems, respectively. The interference avoidance controller 10 calculates and sets, by using the threshold intensity table, threshold intensity which corresponds to the communication data type and the communication system of the application having the highest priority among the currently running applications. The interference avoidance controller 10 determines whether or not the intensity of the interference wave detected by the interference wave detector 6 exceeds the set threshold intensity. In a case where the intensity of the interference wave exceeds the threshold intensity, the interference avoidance controller 10 determines that the communication quality of the wireless LAN communicator 2 or the Bluetooth communicator 3 is deteriorated.

Figure 3:
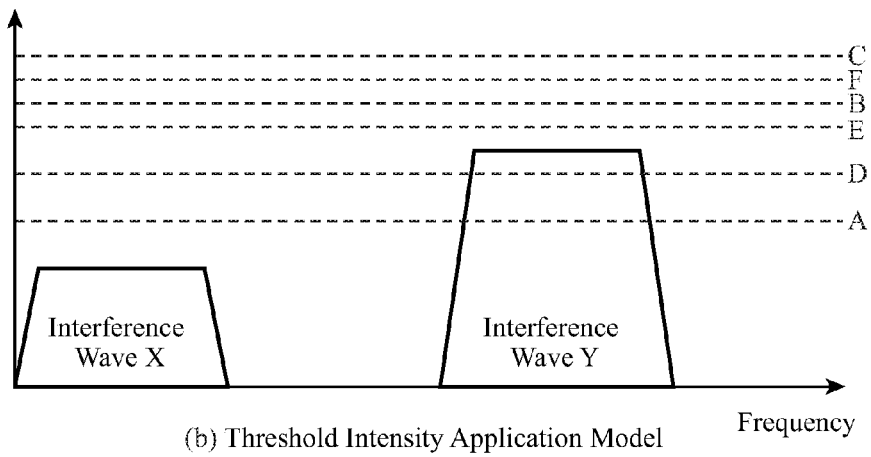
FIG. 3 depicts an application example of a threshold intensity table and threshold intensity of the wireless communication device according to the Embodiment 1.

FIG. 3 depicts an application example of the threshold intensity table and the threshold intensity of the wireless communication device according to the Embodiment 1 of this invention.

FIG. 3(a) represents a threshold intensity table showing threshold intensities corresponding to the communication data types and the communication systems, respectively. FIG. 3(b) represents a case in which a threshold intensity set by referring to the threshold intensity table of FIG. 3(a) is applied to an interference wave.

For example, in a case where the currently running applications are for audio wireless LAN communication and audio Bluetooth communication, the interference avoidance controller 10 determines that the audio Bluetooth communication is the application of the highest priority. Subsequently, reference is made to the threshold intensity table depicted in FIG. 3(a), and the threshold intensity is set as "D" that corresponds to the communication data type of "audio" and the communication system of "Bluetooth".

In FIG. 3(b), since the intensity of the interference wave X does not exceed the threshold intensity "D", the interference avoidance controller 10 determines that the communication quality of the Bluetooth communicator 3 is not deteriorated. Meanwhile, since the intensity of the interference wave Y exceeds the threshold intensity "D", the interference avoidance controller 10 determines that the communication quality of the Bluetooth communicator 3 is deteriorated.

As described above, since the threshold intensity is set by considering the priority order of communication data types and the priority order of communication systems, adaptive setting of threshold intensity is achieved based on the running applications. Therefore, determination as to whether the communication quality is deteriorated can be made in accordance with a communication system of higher priority.

The interference avoidance controller 10 predicts duration where the communication of the wireless LAN communicator 2 or the Bluetooth communicator 3 is affected by radio interference due to the interference wave which has been determined to deteriorate communication quality of the wireless LAN communicator 2 or the Bluetooth communicator 3. The duration of the radio interference may be predicted by using traveling speed acquired by the speed detector 11. The interference avoidance controller 10 sets a threshold time period that corresponds to the communication data type of the application having the highest priority among the currently running applications. The interference avoidance controller 10 decides to perform the interference avoidance when the predicted duration of the radio interference exceeds the set threshold time period.

The interference avoidance controller 10 holds in advance a table in which threshold time periods are each associated with the communication data types (audio/video; music/data). The interference avoidance controller 10 calculates and sets a threshold time period corresponding to the communication data type of the application having the highest priority among the currently running applications by using the threshold time period table. The threshold time periods are set depending on desired real-time quality of the communication data types (audio/video; music/data). For example, in a case where an application, such as audio for which higher real-time quality is desired, is running, the threshold time period is set in shorter. Hence, threshold time periods can be set to satisfy achieve real-time quality of applications with higher priority, and thus communication quality is ensured. Furthermore, in a case where an application with lower real-time quality is running, stable communication is achievable with unnecessary interference avoidance operation being restricted.

Figure 4:
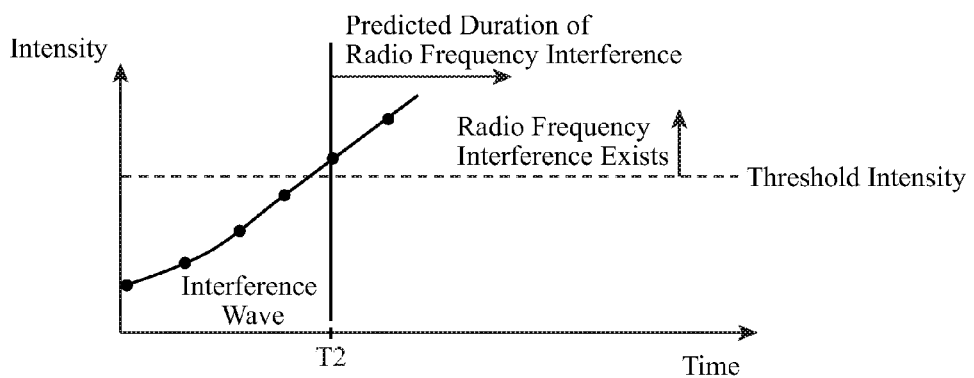
FIG. 4 is an explanatory diagram of prediction of duration of radio interference to be performed by the wireless communication device according to the Embodiment 1.

FIG. 4 depicts duration prediction of radio interference to be performed by the wireless communication device according to the Embodiment 1 of this invention.

In FIG. 4, at time T2 where the intensity of the interference wave exceeds the threshold intensity, the interference avoidance controller 10 begins to predict the duration of radio interference. The intensity of the interference wave is detected by the interference wave detector 6 at prescribed time intervals.

Subsequently, prediction of duration of radio interference is described through a specific example.

First, description is given of a case in which radio interference comes from an external access point.

There is a case where interference wave comes from an external access point. This case means that the vehicle is staying within a coverage area of the external access point where radio interference has occurred. The distance to the external access point can be predicted from the reception intensity of the interference wave by using the average distance within the coverage area of the external access point. A time period before the vehicle is out from the coverage area is predicted from the distance to the external access point, the average distance within the external access point area, and the traveling speed to be obtained from the speed detector 11. The predicted time period is set as the duration of radio interference. It is noted that the average distance within the access point area can be preliminarily estimated from the communication intensity of the wireless LAN communication.

In the configuration where the duration of radio interference is predicted from the distance to an external access point, and the average distance within the external access point area, and the traveling speed, if the traveling speed of the mobile object is low, the predicted duration becomes longer because the time period before the vehicle is out from the coverage area becomes longer. Conversely, if the traveling speed of the mobile object is high, the predicted duration becomes shorter because the time period before the vehicle is out from the coverage area becomes shorter. This configuration is effective for cases where the location of the source of interference is stationary, such as interference from an external access point.

A different possible configuration allows duration of radio interference that is predicted based on time transient of the intensity of an interference wave. The interference avoidance controller 10 refers to the intensity of an interference wave that has been detected at the interference wave detector 6 at specific time intervals. When the intensity of the interference wave indicates an increasing tendency, the interference avoidance controller 10 predicts that radio interference will continue. Conversely, when the intensity of the interference wave indicates a decreasing tendency, the interference avoidance controller 10 predicts that radio interference will not continue. Furthermore, in the case where the interference avoidance controller 10 predicts that radio interference will continue, the duration of the radio interference can be predicted in accordance with an increase rate of the intensity of the interference wave. This configuration of predicting the duration of the radio interference by referring to the time transient of the intensity of an interference wave is effective in a case where the location of the source of interference is moving, such as interference from an adjacent vehicle.

The duration may be predicted by combining the both configurations, namely, the configuration of predicting duration of radio interference from the distance to an external access point, the average distance within the external access point area, and the traveling speed, and the configuration of predicting duration of radio interference based on the time transient of the intensity of the interference wave. By adopting this manner, prediction with higher accuracy is achieved, regardless of whether a location of an interference source is moving.

Upon receiving input of the command for avoiding the frequency of an interference wave from the interference avoidance controller 10, the frequency controller 12 sets frequencies, from which the frequency of the interference wave is excluded, to the wireless LAN communicator 2 and to the Bluetooth communicator 3.

Figure 5:
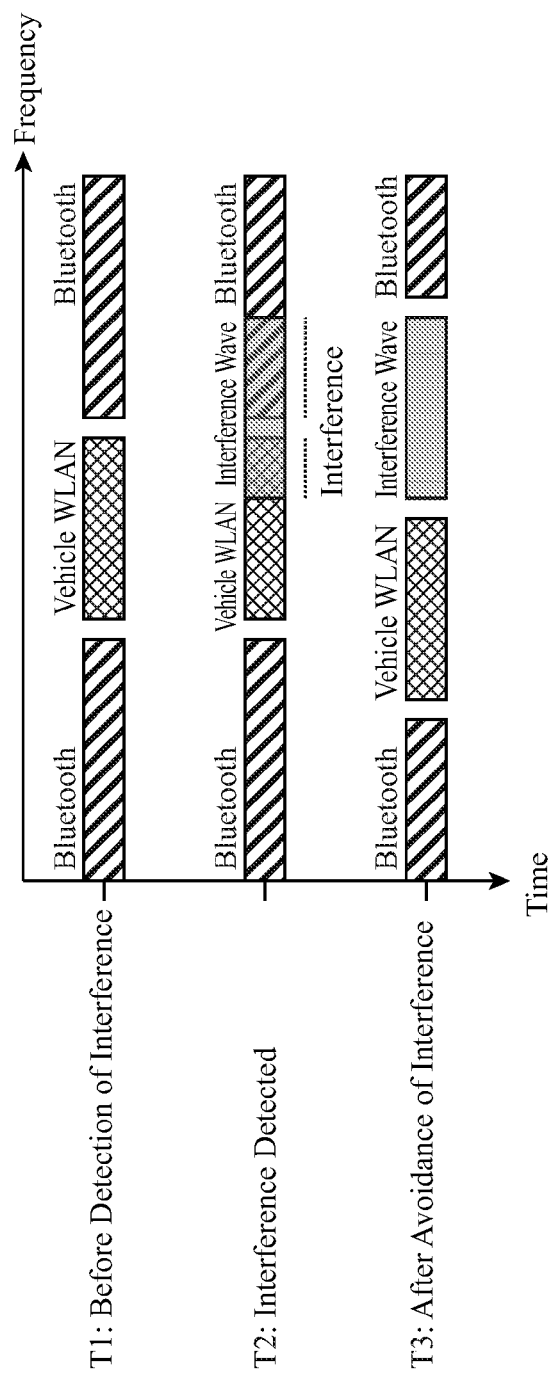
FIG. 5 depicts interference avoidance control to be performed by the wireless communication device according to the Embodiment 1.

FIG. 5 illustrates setting of frequencies resulting from avoidance of an interference wave. A time T1 indicates a case in which the interference wave detector 6 has not yet detected an interference wave. In the time T1, frequencies being used in wireless LAN communication and used in Bluetooth communication of the mobile object are set by the frequency controller 12 so as not to overlap with each other. A time T2 indicates a case in which the interference wave detector 6 has detected an interference wave. In the time T2, frequency portions of the interference wave overlap with the frequencies for wireless LAN communication and Bluetooth communication of the mobile object. A time T3 indicates a result of frequency setting that is performed by the frequency controller 12 to avoid the interference wave. In the time T3, the frequency of the wireless LAN communicator 2 of the mobile object is altered to avoid the frequency of the interference wave, and the frequency of the Bluetooth communicator 3 is set to avoid the frequency of the wireless LAN communicator 2.

Figure 6:
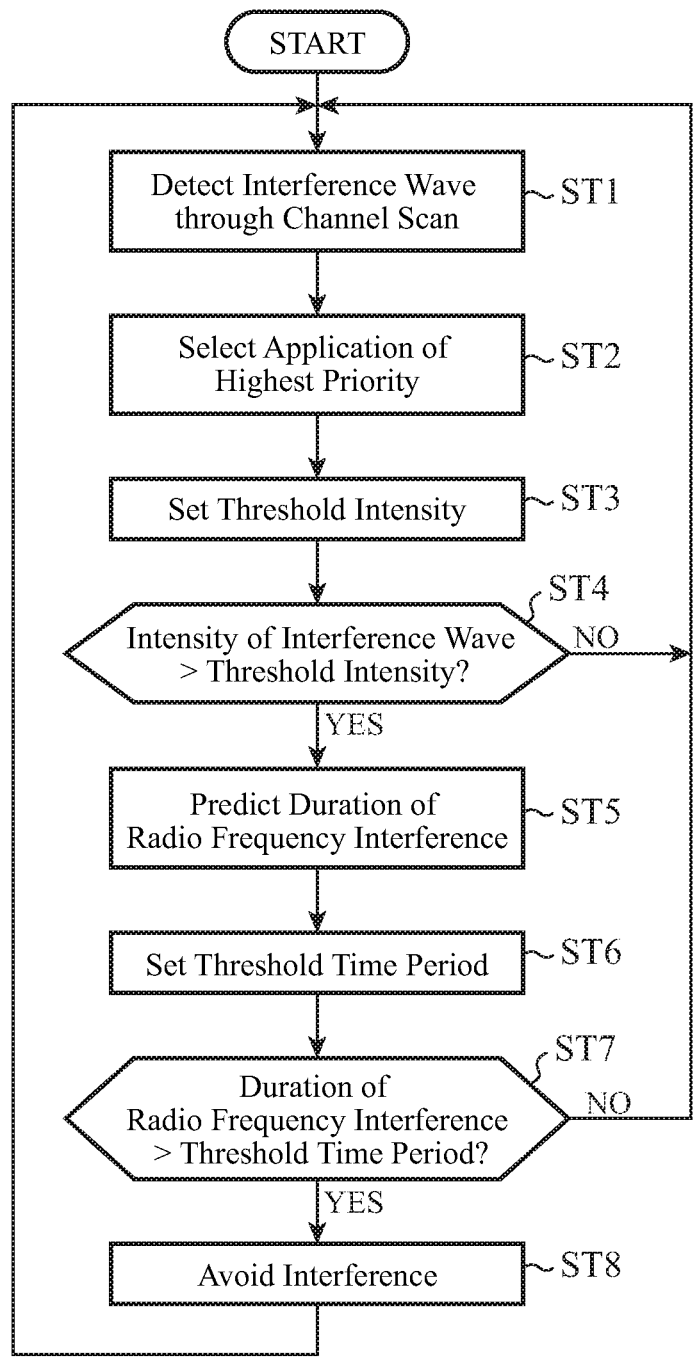
FIG. 6 is a flowchart illustrating operation of the wireless communication device according to the Embodiment 1.

Next, description is given of operation of an interference avoidance process to be performed by the wireless communication device 1. FIG. 6 is a flowchart illustrating operation of the wireless communication device according to the Embodiment 1 of this invention.

The interference wave detector 6 obtains the channel and intensity of an interference wave detected through the channel scan operation, and outputs them to the interference avoidance controller 10 (Step ST1). The interference avoidance controller 10 obtains from the application unit 9 the communication data types (audio/video; music/data) and the communication systems (wireless LAN/Bluetooth) of currently running applications, and selects the application having the highest priority (Step ST2).

The interference avoidance controller 10 refers to the threshold intensity table, and sets threshold intensity based on the communication data type and the communication system of the application having the highest priority selected in Step ST2 (Step ST3). The interference avoidance controller 10 determines whether or not the intensity of the interference wave inputted in Step ST1 exceeds the threshold intensity set in Step ST3 (Step ST4).

In a case where determination is made that the intensity of the interference wave does not exceed the threshold intensity in Step ST4, it is decided that the communication quality will not be lowered, and the operation returns to the process of Step ST1. Meanwhile, in a case where determination is made that the intensity of the interference wave exceeds the threshold intensity in Step ST4, the interference avoidance controller 10 predicts the duration of radio interference by using the traveling speed inputted from the speed detector 11 (Step ST5). The interference avoidance controller 10 sets a threshold time period in accordance with the communication data type of the currently running application having the highest priority (Step ST6).

The interference avoidance controller 10 determines whether or not the duration of radio interference predicted in Step ST5 exceeds the threshold time period set in Step ST6 (Step ST7). In a case where determination is made that the duration of radio interference does not exceed the threshold time period in Step ST7, it is decided that interference avoidance is not needed, and the operation returns to the process of Step ST1. Meanwhile, in a case where determination is made that the duration of radio interference exceeds the threshold time period in Step ST7, the interference avoidance controller 10 outputs the command for avoiding the frequency of the interference wave. In response to the command from the interference avoidance controller 10, the frequency controller 12 outputs frequencies, which has been set to avoid the interference wave, to the wireless LAN communicator 2 and the Bluetooth communicator 3 (Step ST8). After that, the flowchart returns to the process of Step ST1, and the above-described processes are repeated.

In the above-described flowchart, a configuration is illustrated wherein duration of radio interference is predicted by using the traveling speed inputted from the speed detector 11. Alternatively, the duration may be predicted based on the time transient of the intensity of the interference wave. The duration may also be predicted by using both the traveling speed and the time transient of the intensity of the interference wave.

As described above, according to the Embodiment 1, the interference wave detector 6 detects an interference wave of the wireless LAN by the channel scan operation. And, the interference avoidance controller 10 predicts the duration of radio interference, and decides that interference avoidance is needed when the predicted duration exceeds the threshold time period. Hence, unnecessary interference avoidance operation is restricted while avoiding interference wave that could lower communication quality by taking account of varying influence of radio interference. This achieves stable wireless communication.

Besides, according to the Embodiment 1, it is configured such that the interference avoidance controller 10 sets threshold time periods based on the priority order of communication types. Therefore, the real-time quality of communication with higher priority is achieved while ensuring communication quality. In a case of communication with lower real-time quality, unnecessary interference avoidance operation is restricted, and stable communication is achieved.

In addition, according to the Embodiment 1, it is configured such that the interference avoidance controller 10 sets threshold intensity based on the priority order of communication types and communication systems, and in a case where the intensity of the interference wave exceeds the set threshold intensity, determination is made that the communication quality of the wireless LAN communicator 2 or the Bluetooth communicator 3 will be lowered. Therefore, threshold intensity is adaptively changed in accordance with the priority order of communication types and communication systems, and the probability of lowering of communication quality is decidable to support communication with higher priority.

Furthermore, according to the Embodiment 1, the speed detector 11 for detecting the traveling speed of a mobile object is provided, and it is configured such that the interference avoidance controller 10 predicts duration of radio interference based on the distance to an external access point, the average distance within the external access point area, and the traveling speed obtained from the speed detector 11. Therefore, the duration of radio interference is accurately predicted in a case where the location of the source of interference is stationary.

Moreover, according to the Embodiment 1, it is configured such that the interference avoidance controller 10 predicts duration of radio interference based on the time transient of the intensity of an interference wave, i.e., increasing or decreasing tendencies of increase or decrease in intensity of the interference wave. Therefore, the duration of radio interference is predicted with higher accuracy even in a case where the location of the source of interference is moving. Furthermore, the duration of radio interference is predicted with higher accuracy regardless of whether or not the location of the source of interference is moving, by combining the duration prediction based on the traveling speed and the duration prediction based on the time transient of the intensity of the interference wave.

(Embodiment 2.)

Figure 7:
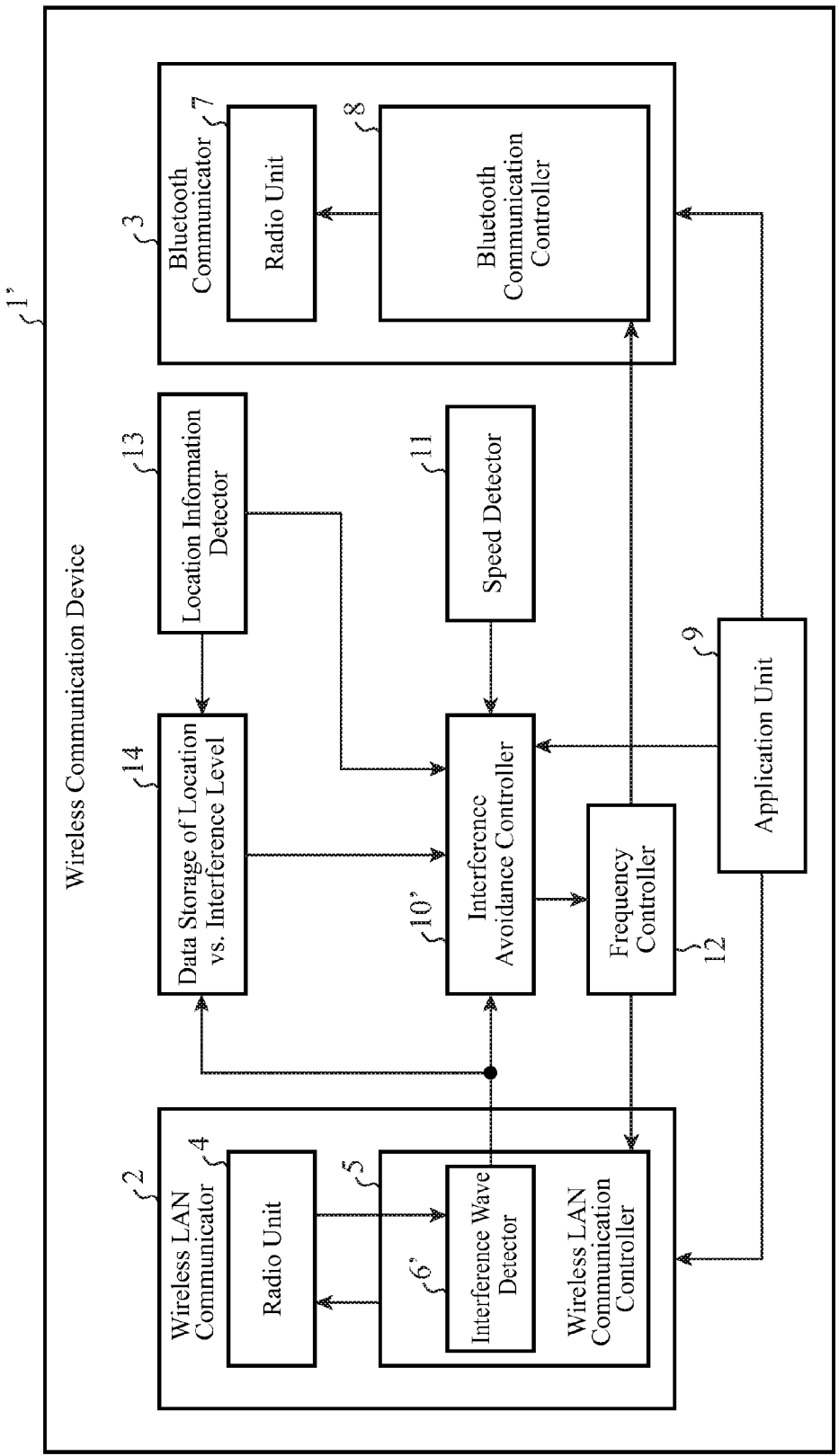
FIG. 7 is a block diagram depicting a configuration of a wireless communication device according to Embodiment 2 of the present invention.

FIG. 7 is a block diagram depicting a configuration of a wireless communication device according to Embodiment 2 of the present invention. A wireless communication device 1' of the Embodiment 2 includes a location information detector 13 and a location versus interference level data storage 14 in addition to the wireless communication device 1 in the Embodiment 1. In the following description, the same reference numerals as those used in the Embodiment 1 are assigned to the same or corresponding portions of the components of the wireless communication device 1 according to the Embodiment 1, and description thereof is not given or is simplified.

An interference wave detector 6' outputs the channel and intensity of a detected interference wave to the location vs. interference level data storage 14 in addition to an interference avoidance controller 10'. The location information detector 13 is configured, for example, by a GPS to obtain information on the current location of the mobile object. The location vs. interference level data storage 14 accumulates the channel and intensity of the interference wave input from the interference wave detector 6' to associate with the location information detected by the location information detector 13.

FIG. 8 is an example representing a location vs. interference level table stored by the location vs. interference level data storage of the wireless communication device according to the Embodiment 2 of this invention. The location vs. interference level table illustrated in FIG. 8 shows the intensities of interference waves in channels 1, 2, . . . , 13 at locations A, B, . . . , E. In this manner, the wireless communication device 1' is configured to automatically accumulate data in the location vs. interference level as the mobile object moves along without preparing a database in advance.

In predicting duration of radio interference, the interference avoidance controller 10' obtains the current location of the mobile object from the location information detector 13. The interference avoidance controller 10' reads the intensity of the interference wave at the obtained current location from the location vs. interference level table stored on the location vs. interference level data storage 14. A traveling direction of the mobile object can be predicted based on the speed information of the mobile object detected by the speed detector 11. In this connection, the duration of radio interference can be predicted by obtaining, from the location vs. interference level table, intensity of the interference wave with respect to a spot predicted to be passed by.

In this manner, the interference avoidance controller 10' predicts, by referring to the location vs. interference level table, magnitude of interference intensity and a traveling location where this magnitude is detected. Accordingly, the duration of radio interference can be predicted even in a case where periodic channel scan operation is unavailable due to failure to secure idle periods at the interference wave detector 6'.

In addition, the duration of radio interference may be predicted by combining the duration prediction based on the speed of the mobile object and the duration prediction based on the time transient of the intensity of the interference wave that are illustrated in the Embodiment 1 with the duration prediction based on the location vs. interference level table illustrated in this Embodiment 2.

As described above, according to this Embodiment 2, the location vs. interference level table is provided in which the channels and intensities of an interference wave are accumulated in association with location information, and it is configured such that the interference avoidance controller 10' obtains the intensity of the interference wave at the current location of the mobile object from the location vs. interference level table, and that duration of radio interference is thus predicted. Hence, occurrence of radio interference can be predicted even in a case where the interference wave detector 6' is unable to perform channel scan operation periodically. And besides, since data accumulated in the location vs. interference level table is used, duration prediction of radio interference is performed accurately.

Furthermore, according to this Embodiment 2, since it is configured to include the location information detector 13 for obtaining the current location of the mobile object, the channels and intensities of interference waves that are detected by the interference wave detector 6' are accumulated to associate with location information. In this manner, the location vs. interference level table is automatically created as the mobile object moves along without preparing a database in advance.

Such a configuration may also be provided as to compensate for cases in which the interference wave detector 6 is unable to perform channel scan operation periodically, by combining the duration prediction based on the speed of the mobile object and the duration prediction based on the time transient of the intensity of the interference wave that are presented in the Embodiment 1 with the duration prediction based on the location vs. interference level table presented in the Embodiment 2. In addition, such a configuration may be provided as to check prediction accuracy by collating duration predicted by using the location vs. interference level table to duration predicted on a real-time basis in order to ensure reliability of the duration predicted on a real-time basis. Furthermore, such a configuration may also be provided as to replace, through the collating process, the value that is decided to have less reliability of the duration predicted on a real-time basis with duration predicted by using the location vs. interference level table.

It should be appreciated that free combination of the embodiments or variation of any components of the embodiments or omission of any components of the embodiments are possible within the scope of the invention.

Industrial Applicability

Wireless communication devices according to this invention are applicable for improving communication quality of wireless communication of a wireless communication device mounted on a mobile object or that between wireless communication terminals.

The invention claimed is:

1. A wireless communication device to be mounted on a mobile object to perform wireless communication with a communication instrument, the device comprising:
   a detector configured to detect an interference wave and a frequency of the interference wave, the interference wave causing radio interference in the wireless communication;
   an interference avoidance controller configured to predict a duration where the wireless communication is affected by radio interference due to the interference wave, and configured to issue a command for avoiding the radio interference due to the interference wave when the predicted duration exceeds a threshold time period; and
   a frequency controller configured to control frequencies used in the wireless communication to exclude the frequency of the interference wave in accordance with the command for avoiding the radio interference issued by the interference avoidance controller, wherein the interference avoidance controller is further configured to set the threshold time period in accordance with priority order of communication data types with respect to the wireless communication.

2. The wireless communication device according to claim 1,
wherein the detector is further configured to detect intensity of the interference wave, and
wherein the interference avoidance controller predicts the duration by using change over time of the intensity of the interference wave detected by the detector.

3. The wireless communication device according to claim 2, further comprising:
a location information detector configured to detect current location of the mobile object; and
a storage configured to store location interference wave data in which the current location of the mobile object detected by the location information detector is associated with a frequency and intensity of the interference wave detected by the detector at the current location,
wherein the interference avoidance controller is further configured to acquire the frequency and the intensity of the interference wave at the current location of the mobile object by referring to the location interference wave data, the interference avoidance controller predicting the duration by using the acquired frequency and intensity.

4. The wireless communication device according to claim 1, wherein the interference avoidance controller is further configured to determine whether or not the interference wave detected by the detector deteriorates communication quality of the wireless communication, and configured to predict the duration when a result of the determination indicates affirmation.

5. The wireless communication device according to claim 4, wherein the interference avoidance controller is further configured to set threshold intensity in accordance with priority order of data types and communication systems with respect to the wireless communication, and configured to determine that the interference wave deteriorates communication quality of the wireless communication in a case where the intensity of the interference wave exceeds the threshold intensity.

6. A wireless communication device to be mounted on a mobile object to perform wireless communication with a communication instrument, the device comprising:
a detector configured to detect an interference wave and a frequency of the interference wave, the interference wave causing radio interference in the wireless communication;
an interference avoidance controller configured to predict a duration where the wireless communication is affected by radio interference due to the interference wave, and configured to issue a command for avoiding the radio interference due to the interference wave when the predicted duration exceeds a threshold time period;
a frequency controller configured to control frequencies used in the wireless communication to exclude the frequency of the interference wave in accordance with the command for avoiding the radio interference issued by the interference avoidance controller; and
a speed detector configured to detect a traveling speed of the mobile object,
wherein the interference avoidance controller predicts the duration by using the traveling speed of the mobile object detected by the speed detector and a coverage of wireless communication where the mobile object is located.

7. The wireless communication device according to claim 6,
wherein the detector is further configured to detect intensity of the interference wave, and
wherein the interference avoidance controller predicts the duration by using change over time of the intensity of the interference wave detected by the detector.

\* \* \* \* \*